D. L. TAYLOR.
GAS TURBINE.
APPLICATION FILED SEPT. 21, 1916.

1,251,132.

Patented Dec. 25, 1917.
6 SHEETS—SHEET 1.

D. L. TAYLOR.
GAS TURBINE.
APPLICATION FILED SEPT. 21, 1916.

1,251,132.

Patented Dec. 25, 1917.

Witnesses
B. S. Brann
L. N. Gillis

Inventor
D. L. Taylor
By
Attorneys

D. L. TAYLOR.
GAS TURBINE.
APPLICATION FILED SEPT. 21, 1916.

1,251,132.

Patented Dec. 25, 1917.
6 SHEETS—SHEET 3.

D. L. TAYLOR.
GAS TURBINE.
APPLICATION FILED SEPT. 21, 1916.

1,251,132.

Patented Dec. 25, 1917.
6 SHEETS—SHEET 4.

Witnesses
Inventor
D. L. Taylor,
By Chandler Chandler
Attorneys

UNITED STATES PATENT OFFICE.

DEAN L. TAYLOR, OF SANTA MARIA, CALIFORNIA.

GAS-TURBINE.

1,251,132.   Specification of Letters Patent.   Patented Dec. 25, 1917.

Application filed September 21, 1916. Serial No. 121,450.

*To all whom it may concern:*

Be it known that I, DEAN L. TAYLOR, a citizen of the United States, residing at Santa Maria, in the county of Santa Barbara, State of California, have invented certain new and useful Improvements in Gas-Turbines; and I do hereby declare the following to be a full, clear, and exact description of the invention, such as will enable others skilled in the art to which it appertains to make and use the same.

This invention relates to improvements in rotary fluid motors and more particularly to improvements in gas turbines of the type shown in my prior patent for gas turbines, patented Sept. 7, 1915, and bearing the No. 1,152,862.

One important object of the invention is to improve the general construction of the gas turbine set forth in the above patent.

A second important object of the invention is to provide a gas turbine of improved character having means operable at timed intervals for providing a compressed explosive charge, which when exploded causes the actuation of a turbine rotor.

A third important object of the invention is to provide a gas turbine of the above type with self contained means for effecting the supply of compressed air and fuel oil to a combustion chamber and thereinafter utilizing the gases of explosion to operate the turbine, the machine being so arranged in an improved manner that the compressor and fuel oil pump are actuated for their purposes in timed relation and the discharge of the gases of explosion also permitted in properly timed relation to the operation of the other parts.

With the above and other objects in view, as will be hereinafter apparent the invention consists in general of certain novel details of construction and combinations of parts hereinafter fully described, illustrated in the accompanying drawings, and specifically claimed.

In the accompanying drawings, like characters of reference indicate like parts in the several views, and:—

In the embodiment of the invention herein illustrated and which represents one preferred type thereof there is provided a main casing 10 having at its lower part supporting feet 11. Within this main casing is located a rotor casing consisting of upper and lower sections 12 and 13 which are substantially circular in cross section, the edges of the circles overlapping at the center. Extending centrally through each of these sections is a rotor shaft 14 whereon is mounted a hollow rotor 15 provided with spiral ribs 16, the rotor being made in two halves with the ribs on one-half constituting right hand spiral gear teeth while the ribs on the other half constitute left hand spiral gear teeth. Thus the two rotors form spiral gears which mesh and in consequence the rotation of one of these rotors causes the other rotor to rotate in synchronism therewith.

One end of the main casing is provided with lateral extensions 17 on each side for purposes to be hereinafter described, and this end is provided with a cap or housing 18, the other end being provided with a cap or housing 19. On these housings are formed outboard bearings 20 for the shafts 14.

Figures 1, 12, 16:
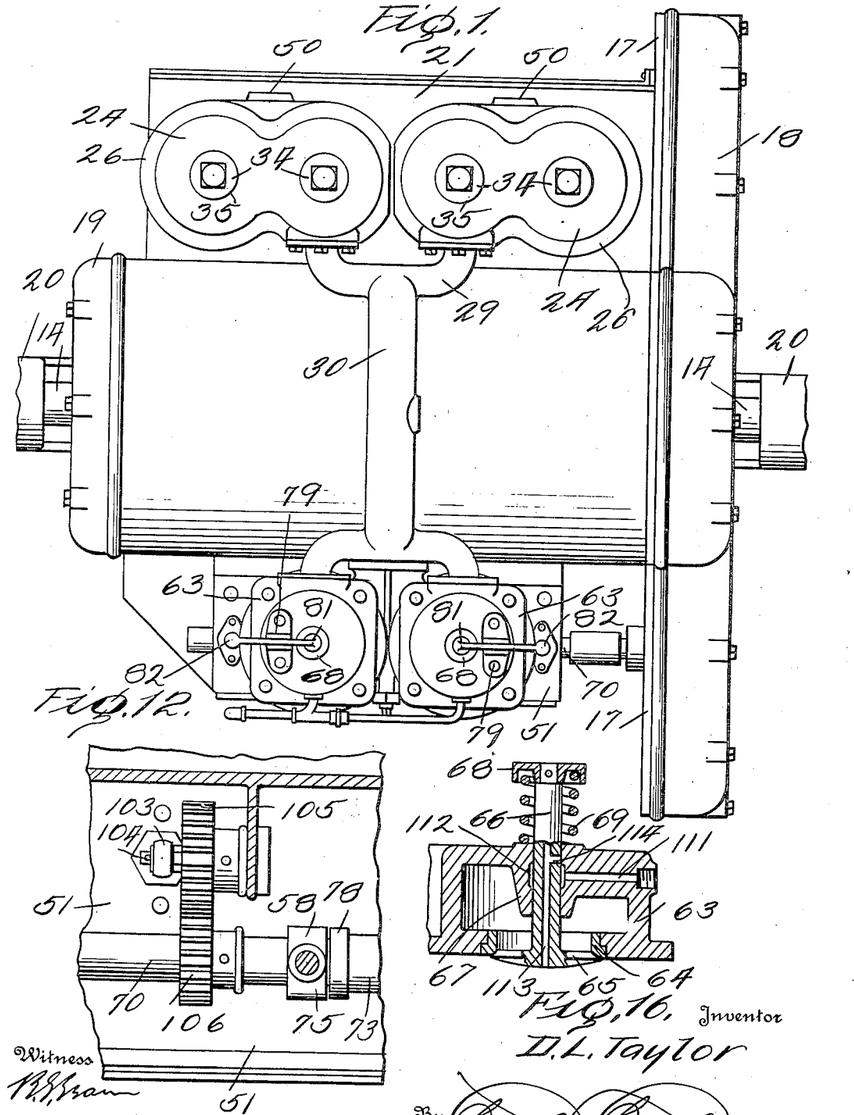
Figure 1 is a plan view of a gas turbine constructed in accordance with this invention.
Fig. 12 is a detail section on the line 12—12 of Fig. 11.
Fig. 16 is a detail section through a portion of the head of one of the explosion cylinders and its valve.
Figure 2:
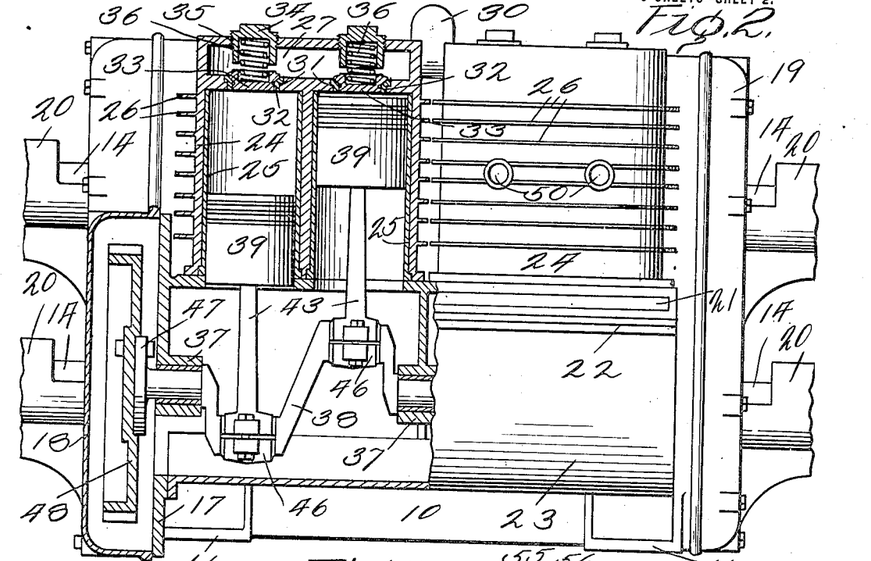
Fig. 2 is an elevation of the compressor side of such a turbine, the view being partly in section through the axes of certain of the compressor elements.
Figure 3:
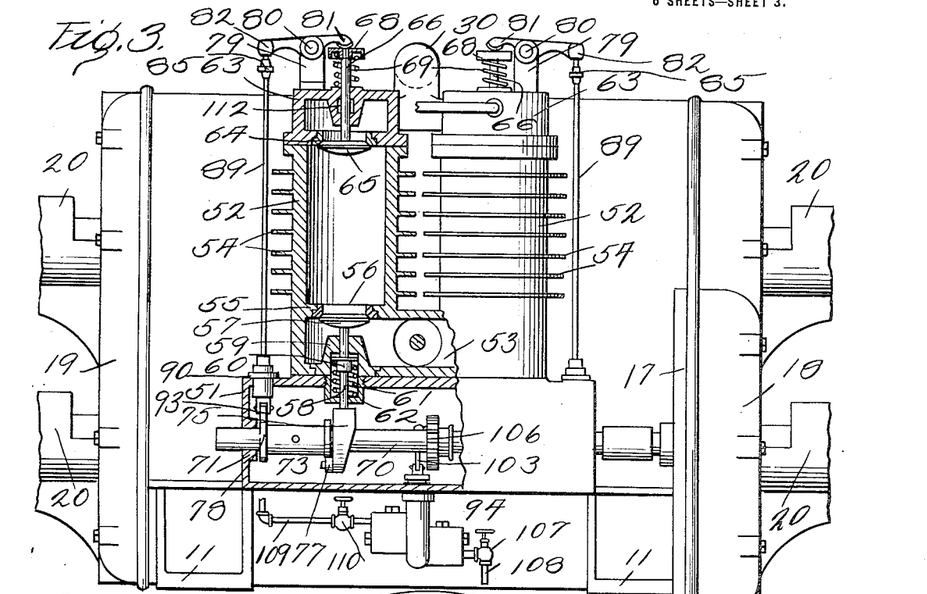
Fig. 3 is an elevation from the explosion side of the turbine, the view being partly in section through the axis of one of the explosion cylinders.
Figure 4:
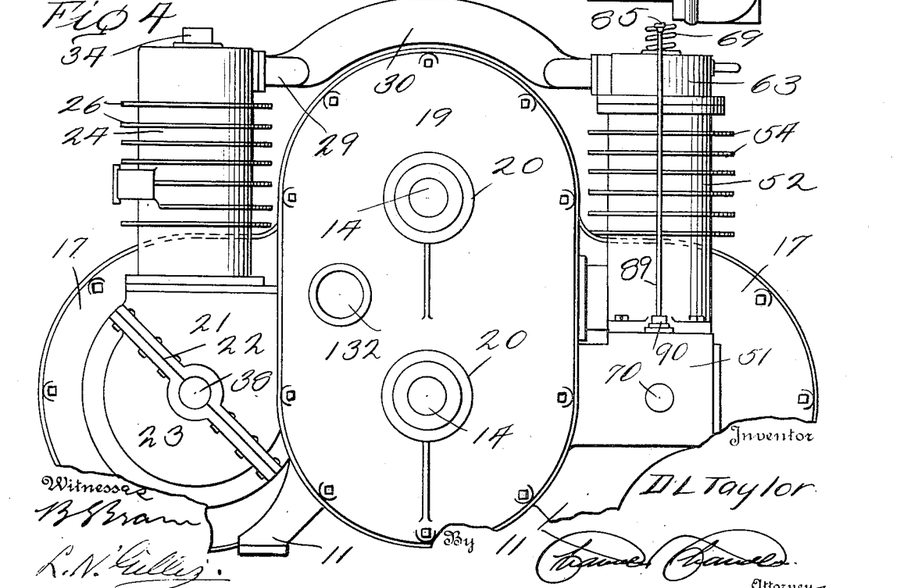
Fig. 4 is an elevation of the gear end of the turbine partly broken away.
Figure 5:
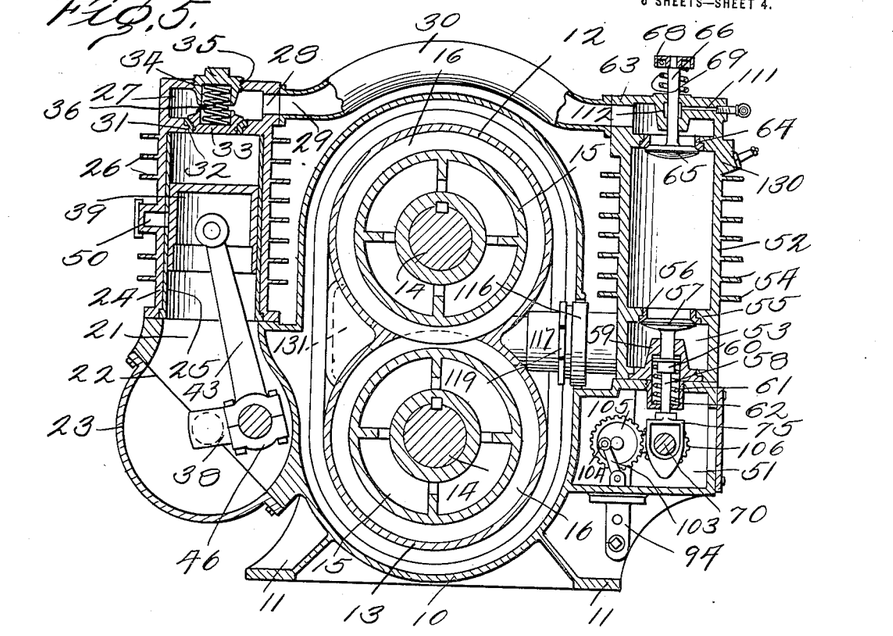
Fig. 5 is a transverse section through the compressor, the turbine, and an explosion chamber.
Figures 6, 13:
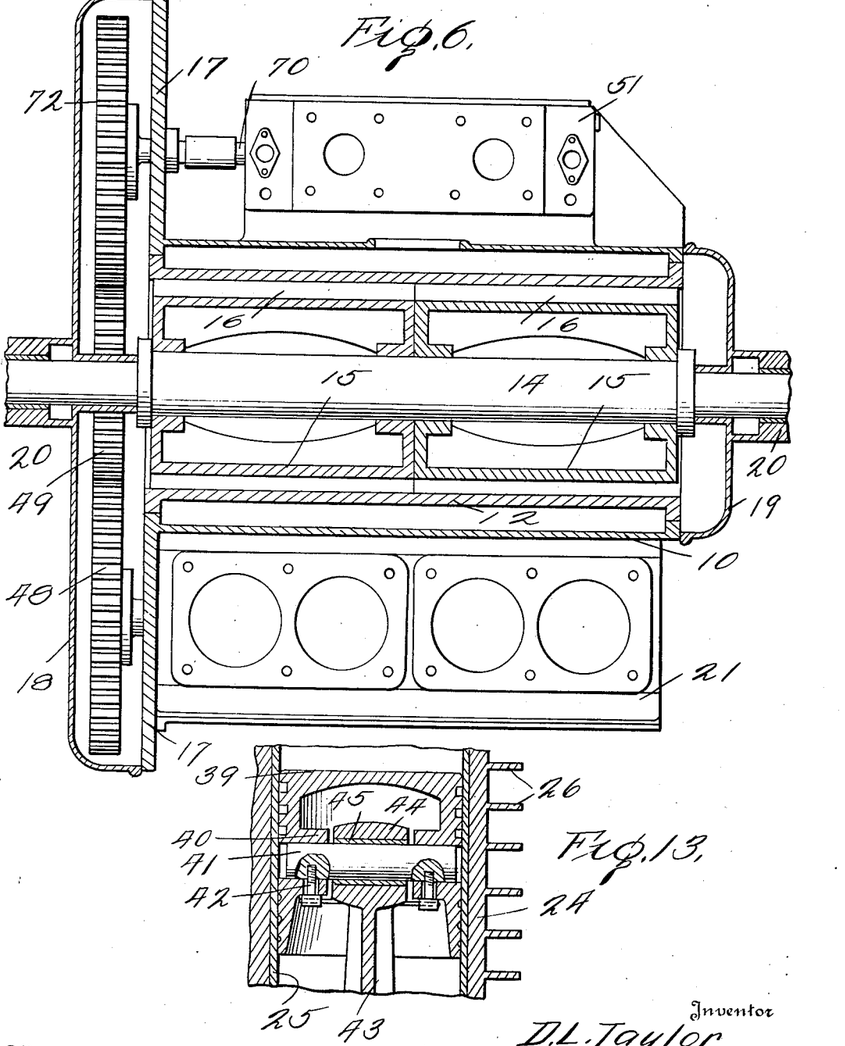
Fig. 6 is a horizontal section through the upper rotor axis of the turbine, the compressor and explosion cylinders being removed.
Fig. 13 is a detail section through one of the compressor pistons showing the arrangement of the connecting rod eye and pin.
Figures 7, 8, 14, 15:
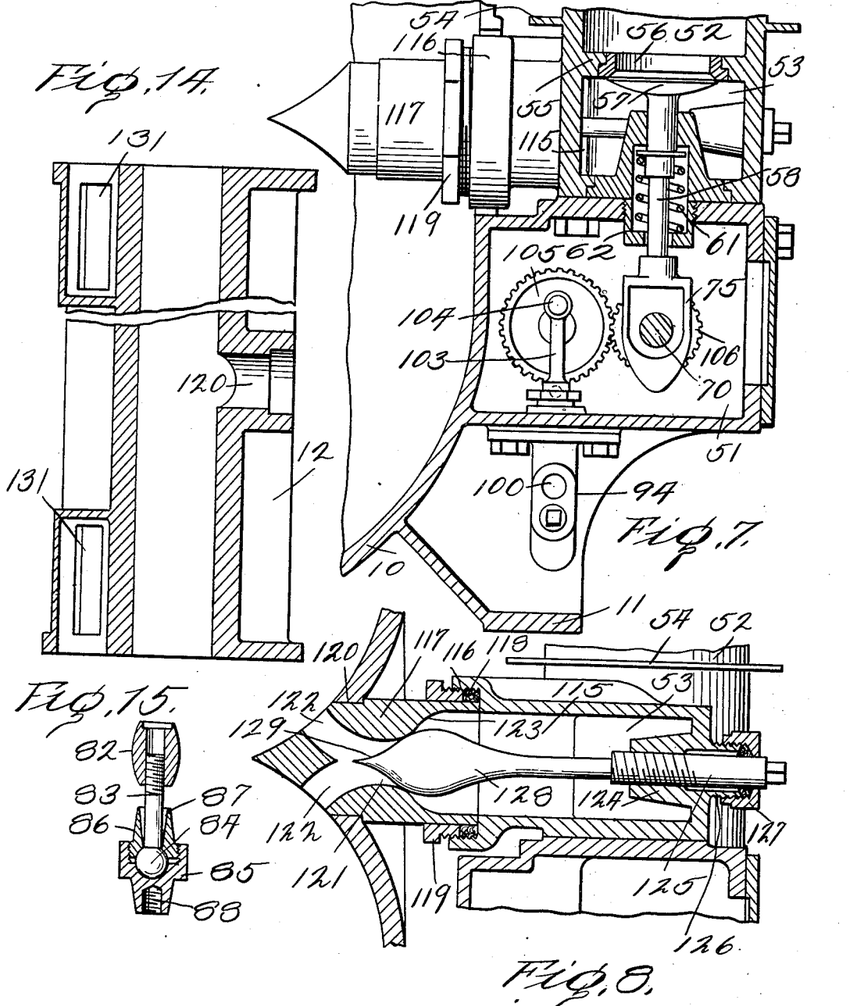
Fig. 7 is an enlarged detail section through a portion of the inlet side of the turbine and showing the nozzle in position and the pump actuating gears.
Fig. 8 is a detail section through the nozzle showing the needle valve.
Fig. 14 is a detail longitudinal section through the rotor casing on the median line between the axes of the rotor.
Fig. 15 is a detail section showing the upper end of one of the valve actuating rods which work the valves in the heads of the explosion cylinders.
Figure 9:
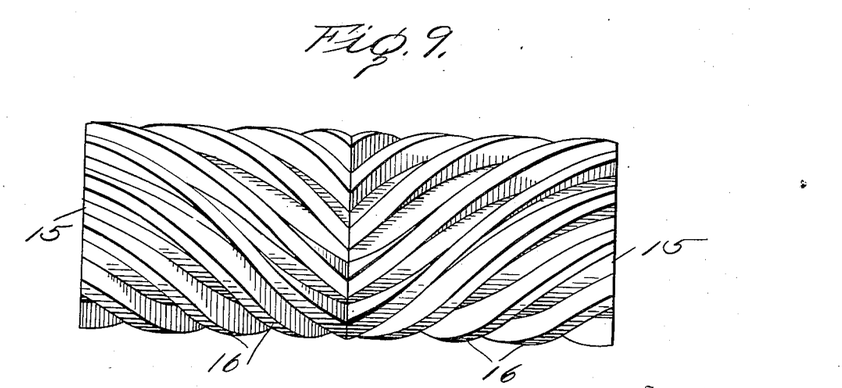
Fig. 9 is a detail elevation of one set of rotors.
Figures 10, 11:
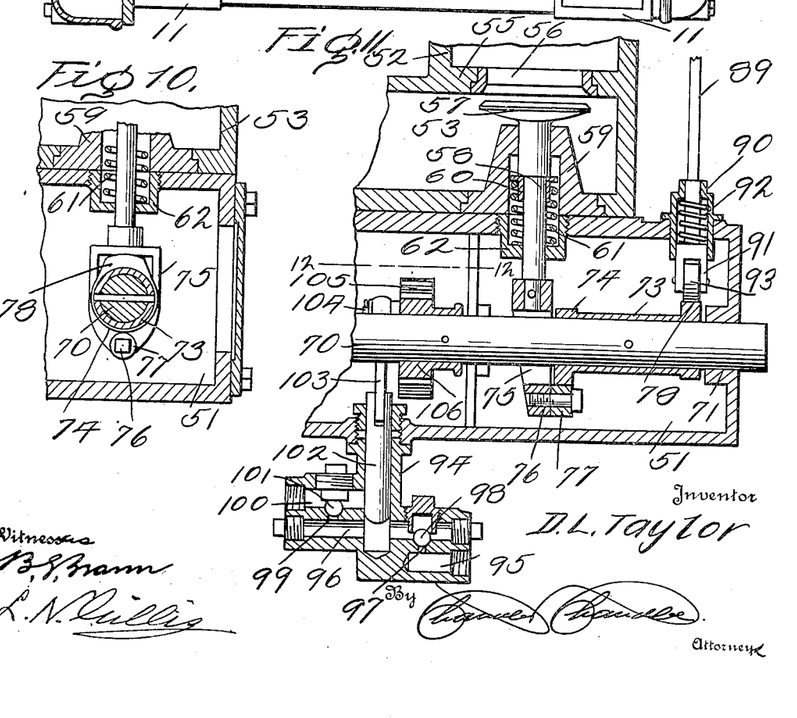
Fig. 10 is a detail section taken transversely through the casing on the inlet side and showing the yoke and roller for the stem of the valve controlling the admission of gas to the nozzle.
Fig. 11 is a vertical longitudinal section taken through the axis of the cam shaft.

The central portion of the main casing 10 is extended laterally on one side so as to provide a crank housing 21, the bottom of which is open along a diagonal plane 22, a suitable cover plate 23 being provided to close this opening and complete the crank casing. The upper part or face of this extension 21 is finished to provide seats for the open lower ends of compression cylinders 24 which are preferably provided with liners 25, said cylinders having the usual radiating ribs or fins 26. These cylinders are preferably cast in pairs as can be seen from Fig. 2 and connecting the tops of each pair is a valve chamber 27 provided with a suitable outlet port 28 so that one of the branches 29 of a compressed air receiver pipe 30 may have connection therewith. The top of each of these cylinders 24 is provided with a centrally disposed opening 31 wherein is fitted a valve seat 32 which receives an upwardly opening valve 33. Axially alined with the valve 33 there is screwed through the top of the valve chamber 27 a plug 34 which has its lower end recessed as at 35, the upper side of the valve 33 being similarly recessed. Fitted in these recesses is a spring 36 which normally holds the valve closed, the tension on the spring being adjustable by means of the screw plug 34.

Mounted in suitable bearings 37 is a crank shaft 38, the axis of the crank shaft lying centrally below the cylinders 24. In each of these cylinders 24 reciprocates a piston 39 which is hollow beneath and is provided with oppositely disposed bearings 40 receiving a cross head pin 41 which is kept from slipping in either direction by means of suitable bolts 42. At 43 is a connecting rod having an eye 44 at one end provided with a liner or bushing 45 through which the pin 41 passes so that this connecting rod can freely rotate on said pin. The head of this connecting rod fits on one of the cranks of the crank shaft 38, being held in position thereon by a cap 46. That end of the crank shaft 38 which projects into the cap or housing 18 is provided with a disk 47 whereto is secured a gear wheel 48 meshing with a gear 49 keyed to the lower rotor shaft 14, the gear 49 being one-half the diameter of the gear 48 so that two revolutions of the rotor shaft are required to effect one revolution of the crank shaft. However, the cranks on the crank shaft are arranged at 180° with respect to each other for each pair of the cylinders, the arrangement further being such that the two central cranks are in alinement while the two outside or end cranks are similarly alined. By reason of this construction one piston of each pair will move up at the same time, the remaining pistons moving downward so that for every revolution of the shaft 14 two of the cylinders will affect a compression stroke.

In order to admit free air to the compressor cylinders each pair of these cylinders is provided with an intake 50 located in such position that it extends through the side wall of the cylinder and communicates freely with the interior when the piston is at the bottom of its stroke. Thus at this time there is a partial vacuum in the cylinder and the air rushes in through the port 50 and fills the cylinder. As the piston rises the port is closed and the air in the upper part of the cylinder compressed. This forces the respective valve 33 open and the compressed air passes out through the valve casing and ports 28 into the receiver 30.

On the side of the engine opposite the compressor the casing 10 is extended laterally to form a housing 51 which is finished on top in order to provide proper seating for the lower ends of a pair of explosion cylinders 52. These explosion cylinders are also cast in a pair and at the lower end of a pair of cylinders there is provided a chamber 53, the bodies of the cylinders being provided with radiating fins or ribs 54. The cylinders proper have partitions 55 at their lower ends, each partition being provided with a central opening wherein is fixed a valve seat 56. Each of these valve seats is arranged to receive a valve 57 mounted on a stem 58 extending through a hollow guide bearing 59 in the bottom of the chamber 53. On each stem 58 in said guide bearing there is provided a collar 60 against which presses the upper end of a spring 61 having its lower end received in a hollow spring seat 62 screwed into the top of the housing 51. By adjusting this spring seat 62 the tension of the spring 61 may be regulated as desired. Mounted on each of the cylinders 52 is a hollow head 63 provided with a centrally disposed opening in its lower part wherein is fitted a valve seat 64 on which seats a downwardly opening valve 65, provided with a stem 66 extending upwardly through a guide bearing 67 in the head 63. On the upper end of each stem 66 is a spring seat collar 68 and between this collar and the head 63 is a spring 69 which normally holds the valve 65 closed.

In order to actuate the valves 57 and 65 there is provided a cam shaft 70 which is mounted in bearings 71 on the ends of the housing 51 and this cam shaft extends into the housing 18 and is there connected to a gear 72 of the same size as the gear 48 and, like it, meshing with the gear 49 so that as the gear 49 rotates twice the cam shaft 70 will make one revolution. On this cam shaft 70 are fixed sleeves 73 each of which carries at one end a disk cam 74. On the lower ends of the valve stems 58 are secured yokes 75 which embrace the shaft 70 and carry at their lower extremities bolts 76 forming the axles for rollers 77 which bear beneath the cams 74 so that every time the shaft 70 rotates each cam 74 will pull down the valve 57 above it thus opening that valve. In order that these valves shall be alternately open the cams 74 are disposed at 180° with respect to each other. On the opposite end of each sleeve 73 is a cam disk 78, each disk 78 being arranged at 180° with respect to the disk 74 on the same sleeve. On each of the heads 63 is a bracket 79 wherethrough passes a pin 80 on which is fulcrumed a lever 81 which bears at one end on top of a respective valve stem 66 while on the other end of which is an enlarged head 82 having a vertical opening therethrough, the lower part of which is threaded for the reception of the stem 83 carrying at its lower end a ball 84. This ball is seated in a ball socket 85, being held therein by a collar 86 having an inverted frusto-conical opening 87 leading from the ball seat and through which the stem 83 passes. The lower end of the seat 85 is provided with a threaded recess 88 for the reception of the upper end of a valve rod 89. Passing through a hollow guide 90 and having on its lower end a forked head 91 which slides in the guide, a spring 92 surrounding the stem within the said guide and normally urging said stem downward. Journaled in the forked end 91 is a roller 93 which bears against the respective cam 78 so that as the shaft 70 rotates the rods 89 will be alternately lifted by these cams 78 and thus the valves 65 will be alternately open, the arrangement being such that the valves 65 alternate with the valves 57 in the same cylinder, that is to say, when one valve 65 in a cylinder is open the valve 57 in that cylinder will be closed while at the same time the remaining valve 65 will be closed and the remaining valve 57 opened.

In order to provide for the introduction of fuel oil to the cylinders 52 there is secured to the bottom of the housing 51 a pump cylinder 94 having an intake passage 95 which communicates with a main passage 96 leading to the bore of the cylinder, communication between the passages 95 and 96 being effected through an opening 97 controlled by an upwardly opening ball check valve 98. This main passage 96 also communicates through a port 99 with a passage 100 constituting the outlet passage, the communication being controlled by an upwardly opening ball check valve 101. Slidable in the cylinder 94 is a plunger 102 provided at its upper end with a rod 103. The upper end of this rod is connected to a crank pin 104 on a gear 105 which meshes with a gear 106 keyed to the shaft 70. The proportions of the gears 105 and 106 are so arranged that with each revolution of the shaft 70 the proper amount of oil will be handled by the pump, the quantity drawn into the pump being controlled by a needle valve 107 located in the inlet pipe 108 which is connected to the oil inlet and receives its supply from a suitable storage tank. Leading from the oil outlet of the pump is a pipe 109 controlled by a valve 110 and this pipe is branched at its upper end, the branches being connected to inlet ducts 111 which communicate with oil pockets 112 formed in the guide bearings 67. Each of the valve stems 66 has a longitudinal oil passage 113 extending therethrough and opening by a lateral passage 114 into the pocket 112 so that the inflowing oil from the pipe 110 will be delivered in a fine stream centrally of the respective cylinder. It is to be observed that at the time when a valve 113 is closed the lateral passage 114 is also closed by reason of the fact that in its upward position the valve carries this passage above the pocket 112.

Disposed centrally of the chamber 53 is a passage 115 leading toward the rotor casing. The outer end of this passage is enlarged and threaded interiorly to form a stuffing box 116 wherein is mounted one end of a nozzle 117, the stuffing box being provided with suitable packings 118 and a gland 119. This nozzle has its inner end extending through an opening 120 formed centrally through the upper and lower section of the rotor casing 12 and the forward end of the nozzle is of such shape as to form a continuation of the inner wall of said casing 12. Through this nozzle extends a peculiarly shaped passage, the wall of which is curved throughout. The center portion of this passage is constricted as at 121 and extending from this constricted portion are branch passages 122 which open respectively against the ribs or teeth of the upper and lower rotors 15. Outwardly of the constricted portion 121 the passage is enlarged by a reverse curve as at 123. Axially alined with the nozzle in the outer wall of the chamber 53 is a threaded boss 124 wherethrough is screwed a needle valve stem 125, a similar boss 126 being formed on the exterior of said outer wall and threaded on the outside to receive a packing cap 127. The outer end of the stem 125 is preferably polygonal in contour to receive a wrench or other like turning tool for adjusting the needle valve in the threaded boss. The inner end of the stem 125 carries a head 128 of general pear shape but having its larger end extending forwardly in a cusp 129 thus forming with the body of the head a reversely curved surface and giving to the head a stream line contour so that when the head is drawn away from the constricted portion of the passage, the gases will flow smoothly and without eddying through the nozzle and its branches thus producing the maximum effect on the rotor since the minimum of energy is wasted in frictional and internal resistances due respectively to abrupt changes in direction and eddies.

In operation, free air received through the ports in the compressor cylinders is compressed and forced under compression into the receiver and at the proper times the valves 65 are opened so that a charge of compressed air is admitted to the proper cylinder 52, fuel oil being injected at this time into the cylinder by reason of the opening of the passage 114 to the pocket 112. The valve 65 will now close and by a suitable timing device, not deemed necessary to be shown, a spark is produced in the charge cylinder, a spark plug boss 130 being provided for each cylinder. The gas in the cylinder will then explode with the usual resultant high pressure, so that when further movement of the engine takes place and the valve 57 opens the gases of explosion will rush through the nozzle and be delivered to the rotor members and will travel longitudinally of these members forcing them to rotate, the exhaust gases escaping through ports 131 formed laterally at each end of the rotor casing and communicating with exhaust pipes 132. It will, of course, be understood that at the time of the explosion in a cylinder its valve 65 will be closed. Since these explosions take place every half revolution of the cam shafts 70 and the valves 57 are alternately opened so that one is opened for each half revolution of said cam shaft there will be a fresh supply of the gases to the rotors for each revolution of the rotor shafts. Now by properly proportioning the pump gears and the other gears a timing effect is obtained so that the operations of all of the parts are coördinated and the proper working of the engine assured.

There has thus been provided a highly efficient and self-contained gas turbine of the kind described and for the purpose specified.

It is obvious that many minor changes may be made in the form and construction of the invention without departing from the material principles thereof. It is not therefore desired to confine the invention to the exact form herein shown and described but it is wished to include all such as properly come within the scope claimed.

What is claimed is:—

1. In a gas turbine, an explosion cylinder having a hollow air receiving head, a downwardly opening valve between the head and the body of the cylinder, a valve stem guide carried by said head and provided with an oil receiving pocket intermediate its ends, a stem for said valve slidable in said guide, said valve and stem having a longitudinal oil passage terminating in a lateral passage adapted to communicate with the pocket when the valve is in one position, means to open and close said valve, and means to supply oil to said pocket.

2. A nozzle and valve for gas turbines of the class described, comprising a body having a passage therethrough branched at its forward end, said passage being constricted gradually intermediate its ends and curved longitudinally to the branches, the branches being curvedly divergent, the inlet end of the nozzle having a wall reversely curved rearwardly from the constricted portion, all of said curved surfaces merging smoothly one into another, and a needle valve having a pear shaped head fitting at its larger end into the constricted portion of the nozzle, the forward and larger end of the head terminating in a cusp merging smoothly into the curvature of said head to form a stream line contour.

3. In a gas turbine, an explosion cylinder having a hollow air receiving head, a valve between the head and cylinder, a guide provided with an oil receiving pocket arranged intermediate of its ends, a stem for said valve slidably mounted in said guide, and provided with a longitudinally, and a transversely extending oil passage, said transverse oil passage adapted to communicate the longitudinal oil passage with the oil receiving pocket of the guide where the stem is in one position, and means for operating said valve.

4. In a gas turbine, an explosion cylinder having a hollow air receiving head, a valve between the head and the cylinder, and provided with a longitudinal and transverse oil passage, means for operating said valve, and means for feeding oil into the cylinder through the transverse and longitudinal oil passage when the valve is in one position of its operation.

5. In a gas turbine, an explosion cylinder having a hollow air receiving head, a guide mounted in the air receiving head and provided with an oil pocket, a valve stem mounted in said guide, and provided with an oil receiving passage adapted to communicate with the oil receiving pocket of the guide when the valve stem is in one position, and means for operating said valve.

6. In a gas turbine, an air compressor, an explosive chamber receiving compressed air from the compressor, a valve for admitting the compressed air to the explosion chamber, and having a hollow stem, means for supplying fuel to the hollow stem of said valve, a rotor casing, a rotor revoluble in said casing, and means for controlling the flow of gases from said explosion chamber to the rotor casing.

7. In a gas turbine, an air compressor, an explosion chamber for receiving air from said air compressor, a pipe connecting said air compressor and said explosion chamber, a valve for regulating the passage of air from the air compressor to the explosion chamber and provided with a hollow stem, means for supplying an explosive fluid to the hollow stem of said valve to form an explosive charge within the explosive chamber, and a rotor casing adapted to receive the products of combustion from the explosion chamber.

8. In a gas turbine, an air compressor, an explosion chamber, adapted to receive compressed air from said air compressor, a valve for controlling the passage of compressed air to said explosive chamber and provided with a central passage, means for supplying a combustible fluid to the central passage of said valve when the same is in its open position to admit said combustible fluid to the explosion chamber, and a rotor casing adapted to receive the products of combustion from said explosion chamber.

9. In a gas turbine, a compressor, an explosion chamber adapted to receive compressed air from said air compressor, a head for said explosive chamber, a valve having a hollow stem mounted in said head for controlling the passage of air from the compressor to the explosive chamber, means for supplying combustible fluid to the said hollow valve stem when the same is in its open position to inject the combustible fluid into the explosive chamber, a rotor casing for receiving the products of combustion from the explosive chamber, and a valve for controlling the passage of the said products of combustion to the rotor casing.

In testimony whereof I affix my signature in the presence of two witnesses.

DEAN L. TAYLOR.

Witnesses:
C. L. DAVIS,
J. F. KAAR.